United States Patent [19]
Rieger et al.

[11] 3,983,917
[45] Oct. 5, 1976

[54] ANTI-SKID AND/OR TIRE-PROTECTION CHAIN

[76] Inventors: Hansjörg Rieger, Saarstrasse 48, 708 Aalen, Wurttemberg; Dietmar H. Holzwarth, Vogelhofstrasse 51, 707 Schwab. Gmund, both of Germany

[22] Filed: Nov. 6, 1974

[21] Appl. No.: 521,265

[30] Foreign Application Priority Data
Nov. 13, 1973 Germany............................ 2357271

[52] U.S. Cl.............................. 152/243; 152/233; 152/241
[51] Int. Cl.².......................................... B60C 27/06
[58] Field of Search........... 152/243, 244, 239, 240, 152/241, 242, 171, 173, 231–233

[56] References Cited
UNITED STATES PATENTS

| | | | |
|---|---|---|---|
| 1,780,864 | 11/1930 | Bull et al. ........................... | 152/243 |
| 3,426,823 | 2/1969 | Rieger................................. | 152/231 |
| 3,490,511 | 1/1970 | Müller et al. ...................... | 152/243 |
| 3,696,853 | 10/1972 | Sobota et al....................... | 152/231 |
| 3,802,477 | 4/1974 | Sobota............................ | 152/239 X |

Primary Examiner—Drayton E. Hoffman
Assistant Examiner—Norman L. Stack, Jr.
Attorney, Agent, or Firm—Smythe & Moore

[57] ABSTRACT

An anti-skid chain having horizontal links and at least one vertical shackle having arms surrounding the horizontal link and firmly connected thereto.

10 Claims, 19 Drawing Figures

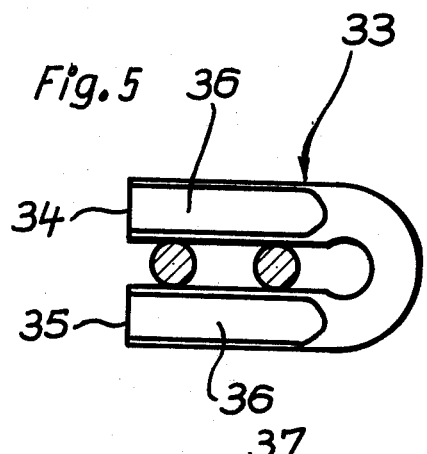
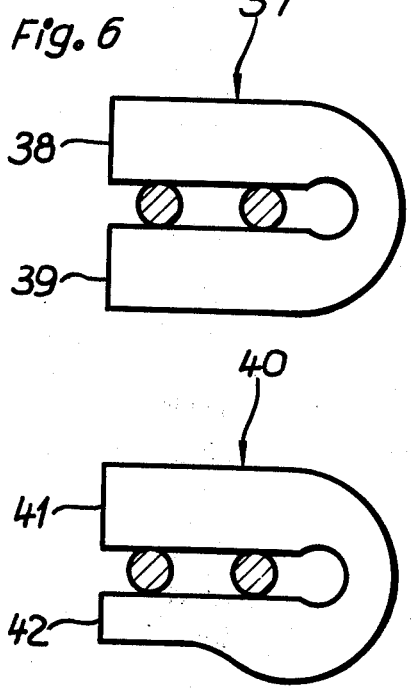
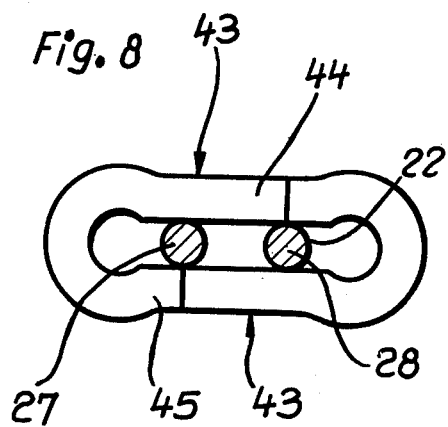
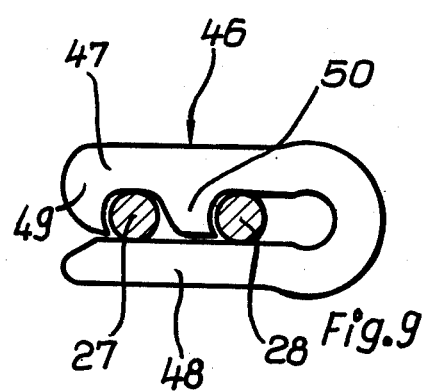
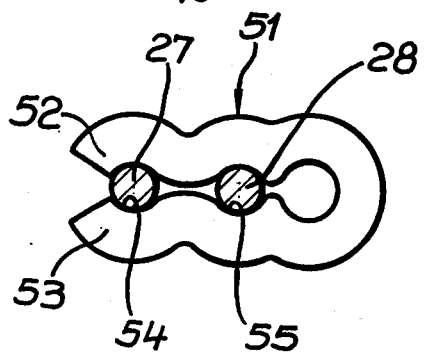

ANTI-SKID AND/OR TIRE-PROTECTION CHAIN

The present invention relates to an anti-skid and/or tire-protection chain having a chain network formed of chain-strand sections and having a plurality of nodes.

Chains of the above type are already known in which the nodes are formed in each case by a horizontal link and a plurality of vertical links attached to the latter and in which the horizontal link is closed by welding after the insertion of the vertical links. These chains are not fully satisfactory inasmuch as the horizontal link of the node is subjected to comparatively large bending stresses since the attached vertical links seek to deform it. Particularly heavy stress must be expected in the case of ring-shaped horizontal members. Here the stresses increase with the inside clearance of the horizontal link and are therefore particularly great at nodes having more than three connecting strands. The known chains also have the disadvantage that the chain links, each of which is open upon mounting, must be relatively strongly deformed after the insertion of the other chain links in order to be brought from the open position into the closed position. Finally, the putting together of the chains forming a node is time consuming, particularly when several links must be introduced through a single insertion slot into a horizontal link.

The object of the present invention is to provide an anti-skid and/or tire-protection chain of the type in question which does not have the above indicated drawbacks, but while easily manufactured, affords assurance both of high tensile strength and of high torsional strength of its nodes.

This object is achieved in accordance with the invention in the manner that at least one part of the nodes is formed of, in each case, at least one horizontal link and at least one vertically arranged shackle, the arms of the shackle which surround the horizontal link being firmly connected with the horizontal link.

The anti-skid and/or tire-protection chain of the invention affords the advantage that the shackle can be pushed in simple fashion over a horizontal link of a continuous chain strand and when connected with the horizontal link contributes to the stability of shape of the latter. By the firm connection between the horizontal link and the shackle, there is obtained a twist-proof node which also makes the section of the chain strand lying between the nodes non-twisting, provided that said sections do not exceed a given length.

It has been found particularly advantageous for the arms of the shackle to be substantially of the same length, for the horizontal link to be developed of ring shape, and for its two shanks to be surrounded by the arms of the shackle. In this case the shackle arms which surround the horizontal link form stiffening ribs which rest on the outside against the horizontal link and have an extremely favorable effect on the strength of the node.

The invention will be described in further detail below with reference to the accompanying drawings in which:

FIG. 5 shows, partially in section, a side view of a node having a U-shaped shackle, the arms of which are flattened laterally;

FIG. 6 shows, partially in section, a side view of a node whose U-shaped shackle has reinforced arms;

FIG. 7 shows, partially in section, the side view of a node whose U-shaped shackle has one reinforced arm;

FIG. 8 shows, partially in section, the side view of a node having two U-shaped shackles for the connecting of four strands of chain;

FIGS. 9, 10, 11 and 12 show a side view of nodes having shackles consisting of spring steel;

Figure 1:
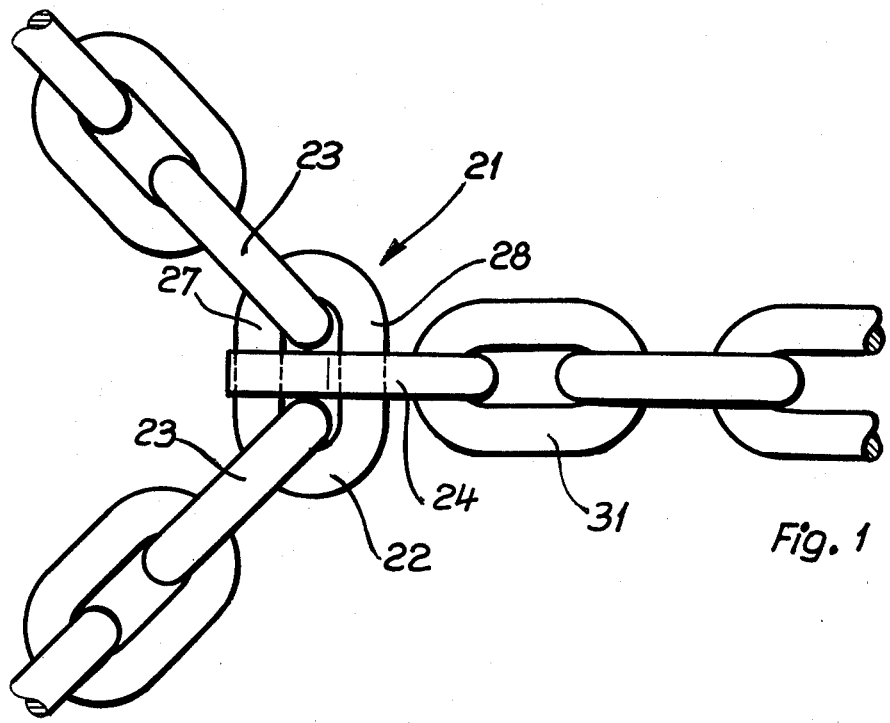
FIG. 1 is a plan view of a node of an anti-skid chain.

The node designated generally as 21 in FIG. 1 consists of a horizontal link 22, a vertical link 23, and a U-shaped shackle 24 connected by welding to the horizontal link and having two arms 25 and 26 which surround the shanks 27 and 28 of the horizontal link 22. In the region of its yoke 29, the shackle is widened so as to form an opening 30 for a horizontal link 31 to be attached therein.

Figure 2:
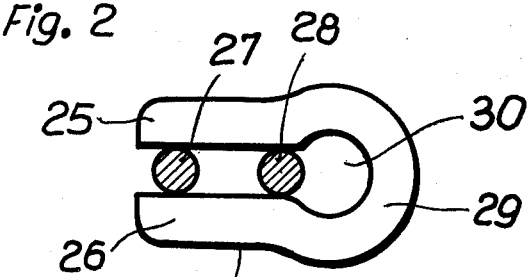
FIG. 2 shows, partially in section, a side view of the parts forming the node before the welding.
Figure 3:
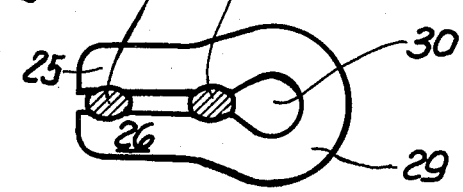
FIG. 3 shows the parts shown in FIG. 2 after they have been welded together on an electric resistance welding machine.

While FIG. 2 shows the horizontal link 22 and the shackle 24 before the two parts are connected by welding, FIG. 3 shows the conditions after the welding. It can be seen that the distance apart of the arms 25 and 26 of the shackle 24 is less after the welding than it was before the welding.

Figure 4:
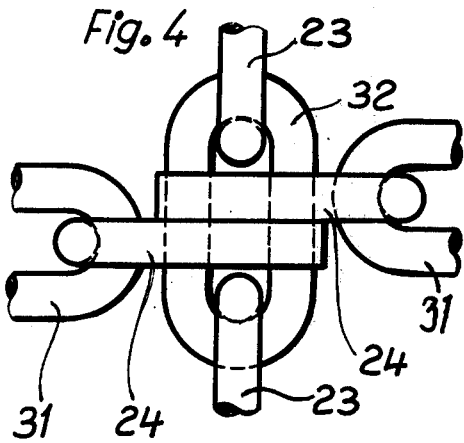
FIG. 4 is a plan view of a node of modified construction having four connecting strands.

While FIG. 1 shows a node having three attached strands, FIG. 4 shows a node having four attached strands. In this embodiment two shackles 24 are welded to one horizontal link 32. To the node thus formed there are connected two horizontal links 31 and two vertical links 23.

FIG. 5 shows a shackle 33 whose arms 34 and 35 are provided with lateral flattenings 36.

The shackle 37 of FIG. 6 has reinforced arms 38 and 39.

The shackle 40 of FIG. 7 has one arm 41 reinforced as compared with the arm 42. A shackle of the type shown in FIG. 7 will be mounted in such a manner that the arm 41 faces the roadway.

While the shackles described above have essentially arms of equal length, the shackles 43 shown in FIG. 8 have arms 44 and 45 of unequal length. By the arrangements selected in FIG. 8, one obtains a closed ring surrounding the shanks 27 and 28 of the horizontal link 22. Four strands of chain can be connected to the node which is thus formed.

FIG. 9 shows a shackle 46 whose arms 47 and 48 grip with spring action over the shanks 27 and 28 of a horizontal link. The projections 49 and 50 of the arm 47 of said shackle provide assurance that the shackle after mounting will retain by force locking the position shown in FIG. 9. Welding is unnecessary in this case.

A shackle 51 which is also made of spring steel is shown in FIG. 10. The arms 52 and 53 of the shackle are bent in such a manner that they form detent troughs 54 and 55 for the shanks 27 and 28 of a horizontal link.

Figure 11:
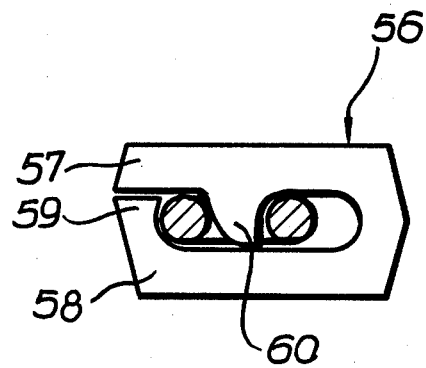

In the case of the shackle 56 shown in FIG. 11, each of the arms 57 and 58 of the shackle has a projection 59 and 60, respectively. In this construction also the shackle 56 is held in force-locked manner in the desired position.

Figure 12:
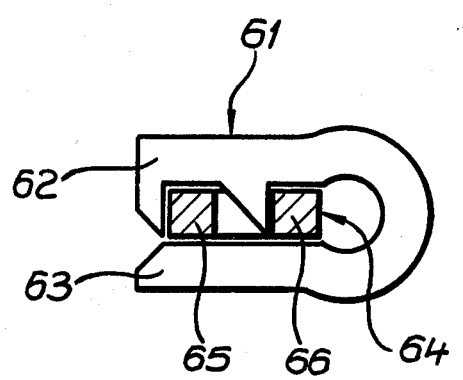

FIG. 12 shows a shackle 61 whose arms 62 and 63 surround a horizontal link 64 of profiled wire. The shanks of this horizontal link are designated 65 and 66. As horizontal links, oval links are regularly and advantageously used. The use of horizontal links of circular shape is however not excluded.

Figure 13:
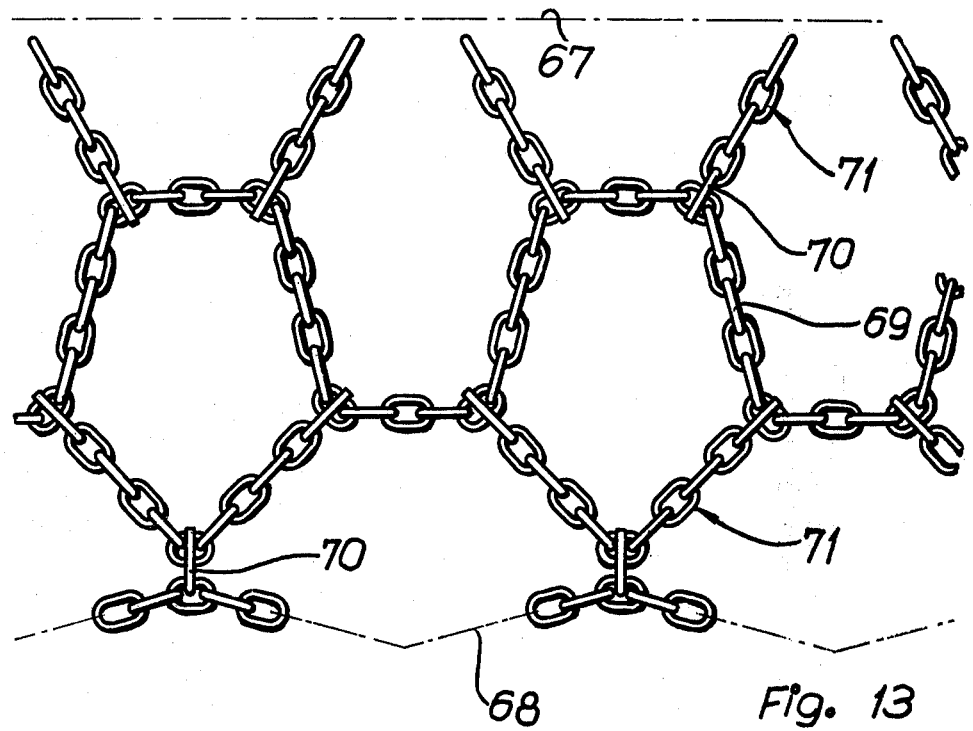
FIG. 13 shows the network of an anti-skid chain in which the nodes have U-shaped shackles arranged obliquely to the direction of travel of the chain.

FIG. 13 shows an anti-skid chain which consists of side chains 67 and 68 and a chain network held by them. The chain network is formed of a continuous chain strand 69 and short lengths of chain 71 connected thereto via U-shaped shackles 70 of the type described above, said short lengths of chain in their turn being preferably also connected via shackles 70 with the side chains. In the embodiment shown in FIG. 13, the shackles 70 which connect the chain strand 69 with the links of chain 71 extend obliquely to the direction of travel of the tire chain shown.

Figure 14:
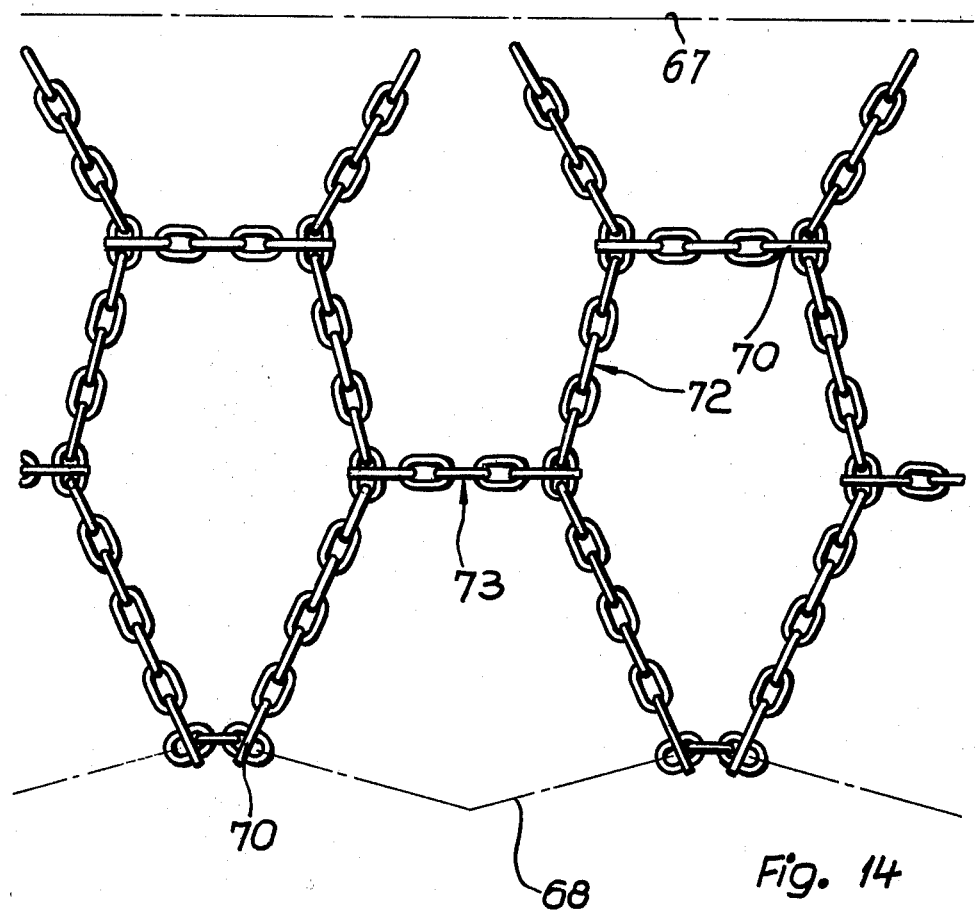
FIG. 14 shows the network of an anti-skid chain in which the nodes have U-shaped shackles arranged in the direction of travel of the chain.

A construction in which the shackles 70 of the network are arranged in the direction of travel of the chain is shown in FIG. 14. This figure shows an anti-skid chain which is formed of transversely extending lengths of chain 72 and longitudinally extending lengths of chain 73, the chain lengths 72 being connected with the chain lengths 73 by shackles. In this embodiment shackles 70 also serve to connect the chain network with the side chains 67 and 68.

Figure 15:
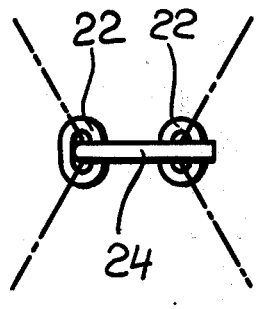
FIG. 15 is a plan view of a node having a U-shaped shackle and four sections of chain strands extending therefrom.
Figure 16:
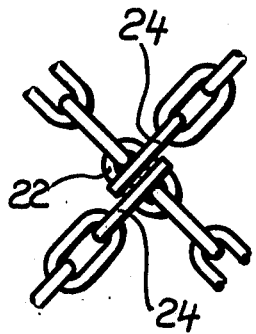
FIG. 16 shows a node with two U-shaped shackles and four strands of chain extending therefrom.
Figure 17:
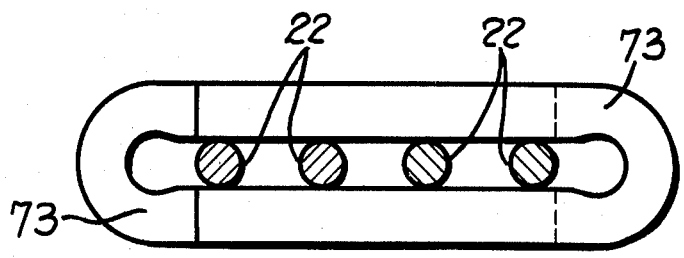
FIG. 17 is a side view of a node having two shackles arranged alongside of each other from which six lengths of chain can extend.

While in FIGs. 13 and 14, chain networks have been shown having nodes from which, in each case, three chain strands extend, FIGS. 15 and 16 show nodes from which four chain strands extend. In the embodiment shown in FIG. 15, the node is formed of two horizontal links 22 and a shackle 24. In the embodiment in accordance with FIG. 16, one horizontal link 22 and two shackles 24 arranged alongside each other serve to form the node.

By the use of shackles 73 having very long arms arranged alongside of each other in the manner shown in FIG. 16, it is also possible to form nodes to which six chain strands can be connected. This is obtained in the manner that the arms of the shackle surround in each case two horizontal links 22 rather than a single horizontal link.

Figures 18, 19:
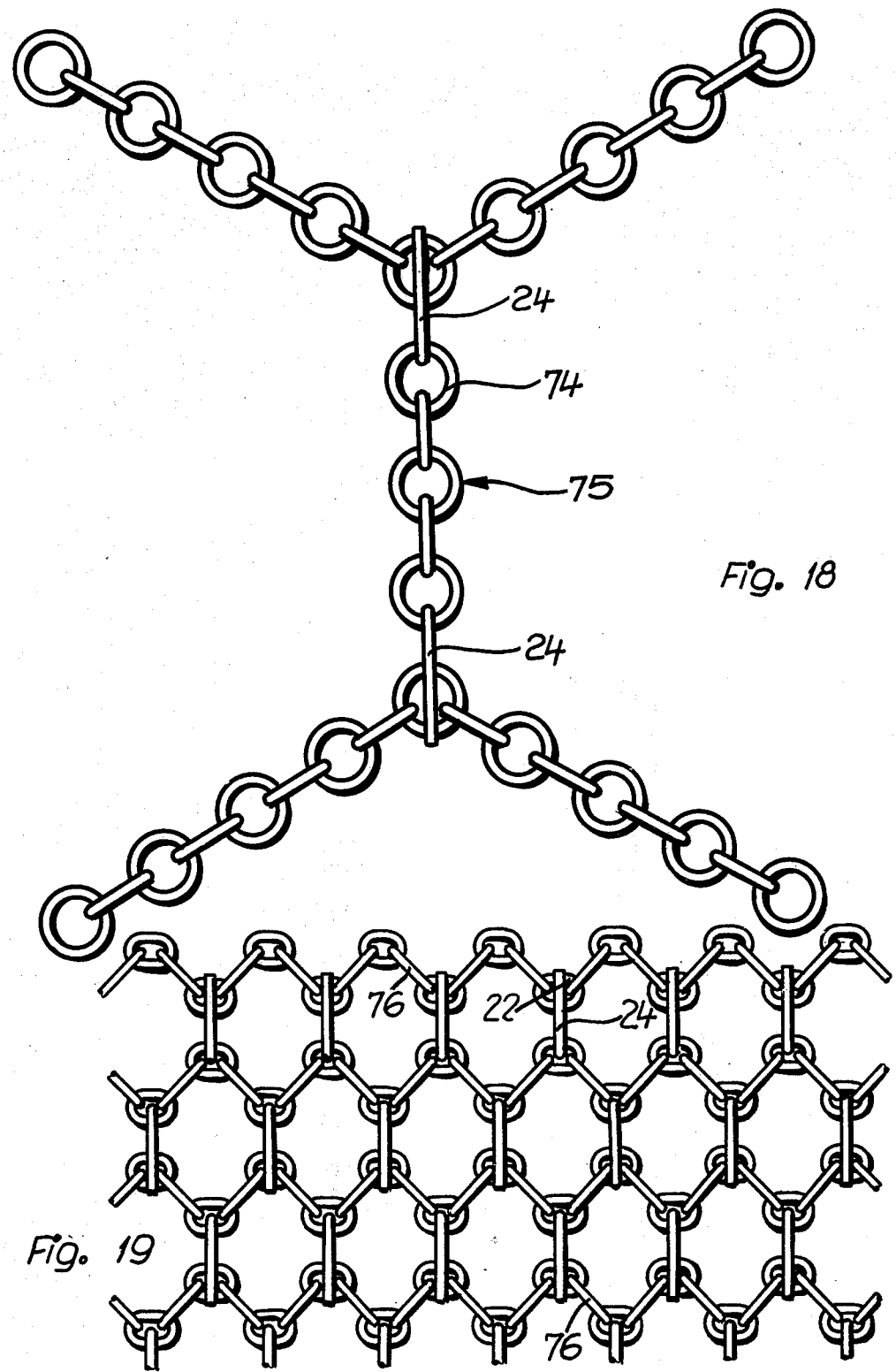
FIG. 18 is a plan view of a track crossing in which the U-shaped shackles of the nodes extend over horizontal links of circular shape.
FIG. 19 shows the tread network of a tire-protection chain in which continuous chain strands are used and the U-shaped shackles are so arranged that in each case a vertical link is present between the nodes.

FIG. 18 shows the track crossing of an anti-skid chain which has circular horizontal links 74. In this case also the nodes are formed by shackles 24. When the track pieces 75 which consist of a maximum of five links are, as in the case shown in the drawing, used, the resistance to twisting of the nodes is transmitted to the track pieces 75 so that assurance is obtained of good track guidance of the chain.

FIG. 19 finally shows a tire-protection chain which consists of chain strands 76 which can be formed from one continuous chain and in which, in each case, every second horizontal link 22 is connected via shackles 24 with one or the other of the chain strands adjacent the individual chain strands. The chain network shown in FIG. 19 is characterized not only by exceedingly good resistance to twisting but it furthermore affords the advantage that it can be mounted very easily and, in particular when using shackles of resilient material, permits a rapid replacement of worn parts.

By means of the shackles it is possible to connect chain strands of different thickness and different material together and produce, for instance, a strong tread network with fewer expensive side parts. Within the meaning of this application, the terms "anti-skin" and "tire-protection" can be used interchangeably.

What is claimed is:

1. An anti-skid tire chain having a chain network formed of chain strands comprising horizontal and vertical chain links connected to one another and having a plurality of nodes, at least a part of the nodes being formed in each occurrence of at least one of the chain strands horizontal chain links and at least one vertically arranged substantially U-shaped shackle, at least one arm of a shackle being welded at two spaced areas to an adjacent horizontal chain positioned between said arms to prevent twisting therebetween.

2. An anti-skid tire chain as claimed in claim 1 wherein the arms of said shackles comprise yokes, said yokes being of greater thickness than the balance of said shackles.

3. An anti-skid tire chain as claimed in claim 1 wherein the chain strand sections between two nodes are formed of three to five links.

4. An anti-skid tire chain as claimed in claim 1 wherein at least part of the nodes is formed of one horizontal link and two shackles.

5. An anti-skid tire chain as claimed in claim 4 wherein the arms of the shackles are of unequal length and lie alongside of each other.

6. An anti-skid tire chain as claimed in claim 4 wherein the arms of the shackles have their front ends facing each other.

7. An anti-skid tire chain as claimed in claim 1 wherein the shackles are oriented in the direction of travel.

8. An anti-skid tire chain as claimed in claim 1 wherein at least one arm of the shackles is reinforced.

9. An anti-skid tire chain as claimed in claim 1 wherein at least part of the nodes consist of two horizontal links connected by the shackles.

10. An anti-skid tire chain as claimed in claim 1 wherein there are continuous chain strands having a plurality of horizontal links and of which in each case, every second horizontal link is connected by shackles with one or the other of the chain strands adjacent the individual chain strands.

* * * * *